United States Patent [19]
Siegel

[11] Patent Number: 5,132,553
[45] Date of Patent: Jul. 21, 1992

[54] LED PULSE SHAPING CIRCUIT

[75] Inventor: Stefan A. Siegel, Fogelsville, Pa.

[73] Assignee: AT&T Bell Laboratories, Murray Hill, N.J.

[21] Appl. No.: 767,350

[22] Filed: Sep. 30, 1991

Related U.S. Application Data

[63] Continuation of Ser. No. 563,147, Aug. 6, 1990, abandoned.

[51] Int. Cl.$^5$ .............. H03K 3/01; H03K 5/01
[52] U.S. Cl. .............. 307/270; 307/241; 307/268; 307/311; 307/555
[58] Field of Search .............. 307/241, 254, 263, 268, 307/270, 311, 555; 372/38

[56]  References Cited

U.S. PATENT DOCUMENTS

| | | | |
|---|---|---|---|
| 3,770,986 | 11/1973 | Drehle | 307/254 |
| 3,828,206 | 8/1974 | Zuk | 307/254 |
| 3,976,932 | 8/1976 | Collins | 307/254 |
| 4,166,947 | 9/1979 | Dirksen | 455/612 |
| 4,198,602 | 8/1978 | Nishijima et al. | 307/555 |
| 4,262,320 | 4/1981 | Herron | 307/241 |
| 4,295,226 | 10/1981 | Dombrowski | 455/618 |
| 4,496,849 | 1/1985 | Kotowski | 307/254 |
| 4,585,953 | 4/1986 | Gaudenzi et asl. | 307/254 |
| 4,636,654 | 1/1987 | Lach | 307/260 |
| 4,795,916 | 1/1989 | Liron | 307/355 |
| 4,939,381 | 7/1990 | Shibata et al. | 372/38 |
| 5,028,820 | 7/1991 | Sullivan | 307/443 |

OTHER PUBLICATIONS

"High-Speed 1.3-μm LED Transmitter . . . ", T. Suzuki et al., *Journal of Lightwave Technology*, vol. LT-4, No. 7, Jul. 1986 pp. 790-794.

Primary Examiner—Stanley D. Miller
Assistant Examiner—Terry D. Cunningham
Attorney, Agent, or Firm—Wendy W. Koba

[57]  ABSTRACT

An LED pulse shaping circuit is disclosed which is capable of providing improved rise time (using current peaking) and fall time (using charge extraction). The pulse shaping circuit consists of a conventional differential current switch coupled to a pair of switching elements and resistance elements. A first switching element is activated at the beginning of a pulse to provide for an initially increased drive current to the LED, the value of a first resistance element used to determined the level of the increased drive current. The current peaking thus results in decreasing the rise time of the LED. The remaining switching element and resistance are utilized, in conjunction with the differential current switch, to provide a reverse current flow through the LED at the end of the pulse. The charge extraction thus results in decreasing the fall time of the LED.

7 Claims, 3 Drawing Sheets

LED PULSE SHAPING CIRCUIT

This application is a continuation of application Ser. No. 07/563,147, filed on Aug. 6, 1990, now abandoned.

BACKGROUND OF THE INVENTION

1. Field of the Invention

The present invention relates to an LED pulse shaping circuit and, more particularly, to a variable switched circuit capable of improving both the rise time and fall time of an LED.

2. Description of the Prior Art

The LED has emerged as a promising optical source for applications such as local area networks (LANs), computer networks, and interoffice communication system which are less than about 3 km in length. Interest in utilizing LEDs is primarily due to their lower cost versus laser-based alternatives. For example, employing high power LEDs in transmitters greatly relaxes the alignment tolerances for the optical assembly which coupled to the LED to the communication fiber. Unfortunately, high power LEDs, especially long wavelength devices, are usually unsuitable for high speed applications (i.e., >100 Mb/s due to their relatively slow rise and fall times (typically >3 ns).

A solution to the slow response time problem of these LEDs is to include a pulse-shaping circuit in the LED trasmitter. Pulse shaping circuits generally perform two functions: current peaking and or charge extraction. Current peaking on the rising edge of the LED drive current pulse shorts the optical rise time by quickly charging the space charge capacitance $C_s$ of the LED and thus eliminates the need for a DC prebias (which can degrade the extinction ratio). Charge extraction on the trailing edge of the drive current pulse forces a large reverse current through the LED which discharges the diffusion capacitance $D_d$. This reverse current, applied for a relatively short period of time, rapidly sweeps out the remaining injected carriers instead of allowing them to recombine, thus reducing the tail on the optical falling edge.

U.S. Pat. No. 4,166,947, issued to J. P. Dirksen on Sep. 4, 1979 is illustrative of the conventional techniques used to improve the fall time of LEDs. Dirksen discloses resistive shunting of an LED in response to a turn-off signal to provide a low impedance path for the elimination of the minority carriers in the device. An alternative arrangement is disclosed in U.S. Pat. NO. 4,295,226 issued to L. C. Dombrtoski on Oct. 13, 1981. Dombrowski discloses a driver circuit arranged to bias the LED so as to draw current during either its ON or OFF state. The arrangement allows for the effective overdriving of current through the LED in the reverse, or negative direction. This overdriving of the LED aids the sweeping of minority carriers out of the junction region and thereby improves the fall time of the LED optical output. However, since the LED draws current during both the ON and OFF states, different levels of optical output will exist in each state, requiring additional threshold detection circuitry to determine the state of the device.

Thus, a need remains in the art for a pulse shaping circuit which s capable of improving both the rise and fall times of LEDs while overcoming the limitations of the prior art arrangements.

SUMMARY OF THE INVENTION

The need remaining in the prior art is addressed by the present invention which relates to an LED pulse shaping circuit and, more particularly, to a switched circuit capable of providing both current peaking and charge extraction.

In accordance with one embodiment of the present invention, a conventional differential current switch driver circuit for an LED is modified to include a pulse shaping circuit comprising first means for providing a current peak of a predetermined value of the LED on the rising edge of a pulse (to decrease the LED rise time) and second means for providing a reverse current to the LED at the end of the pulse (to decrease the LED fall time). A preferred pulse shaping circuit utilizes a transistor and resistor pair to form each means. By controlling when the transistors turn ON and OFF, in concert with the operation of the differential current switch driver circuit, pulse shaping is achieved.

It is an advantage of the present invention that the degree of pulse shaping may be easily controlled by utilizing variable resistors and adjusting their values and/or timing of the delay between the activation of the pair of pulse shaping transistors. Further, the variable resistor values may be adjusted to tailor the current peaking and charge extraction abilities to the characteristics of the particular LED coupled to the pulse shaping circuit.

Other and further advantages of the present invention will become apparent during the course of the following discussion and by reference to the accompanying drawings.

BRIEF DESCRIPTION OF THE DRAWING

Referring now to the drawings.

DETAILED DESCRIPTION

Figure 1:
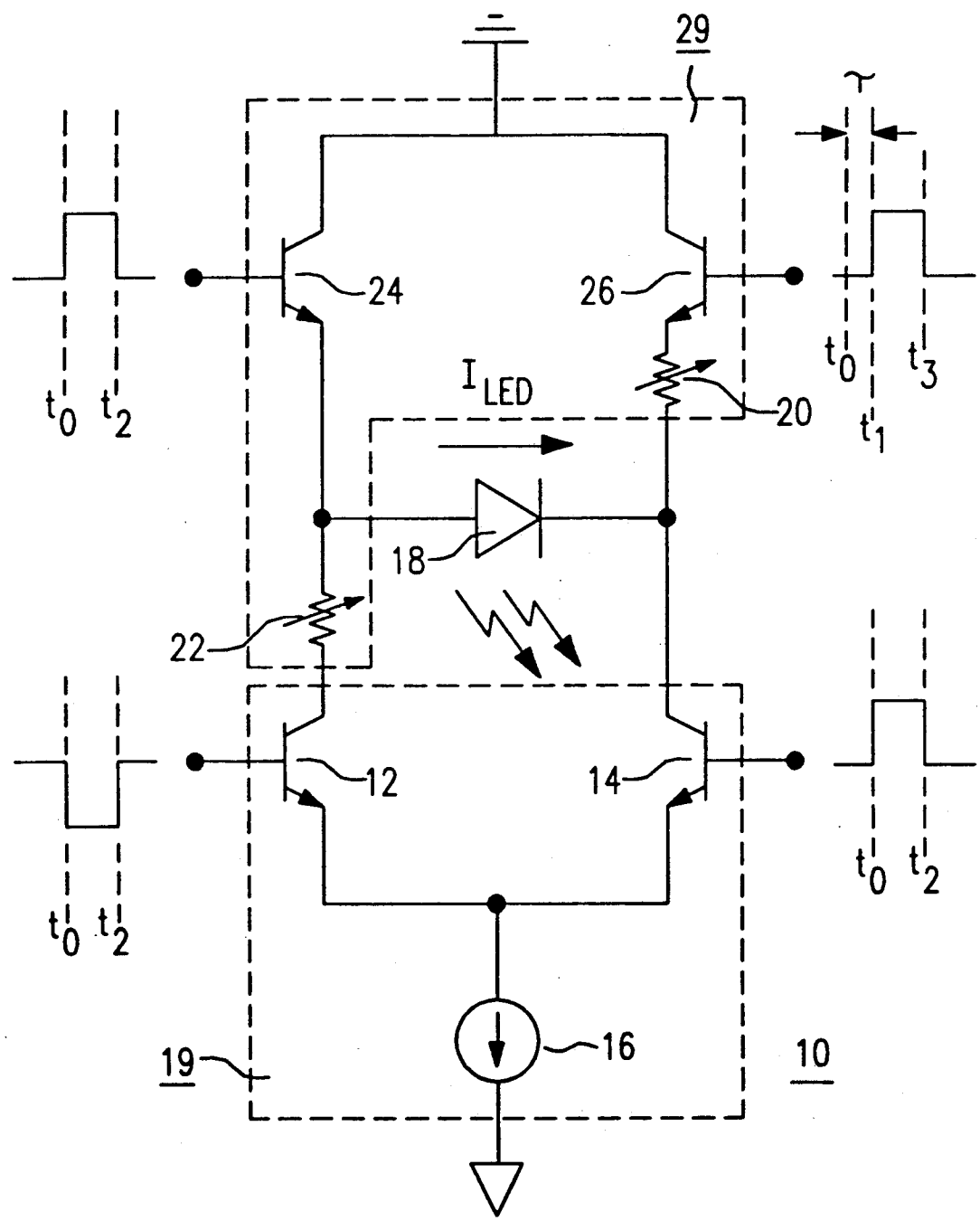
FIG. 1 illustrates an exemplary switched bridge pulse shaping circuit of the present invention.

FIG. 1 illustrates an exemplary pulse shaping circuit 10 formed in accordance with the teachings of the present invention. As shown, circuit 10 includes a first pair of transistors 12, 14 and current source 16 coupled as shown to an LED 18 so as to form a conventional differential current switch 19 therewith. A pair of resistors 20 and 22 are utilized as current limiting devices at the terminals of LED 18. A second pair of transistors 24, 26 function, as described in detail below, to steer the current through LED 18 so as to provide either current peaking or charge extraction. The combination of transistors 24, 26 with variable resistors 20, 22 thus form the pulse shaping portion 29 of circuit 10.

Figure 2:
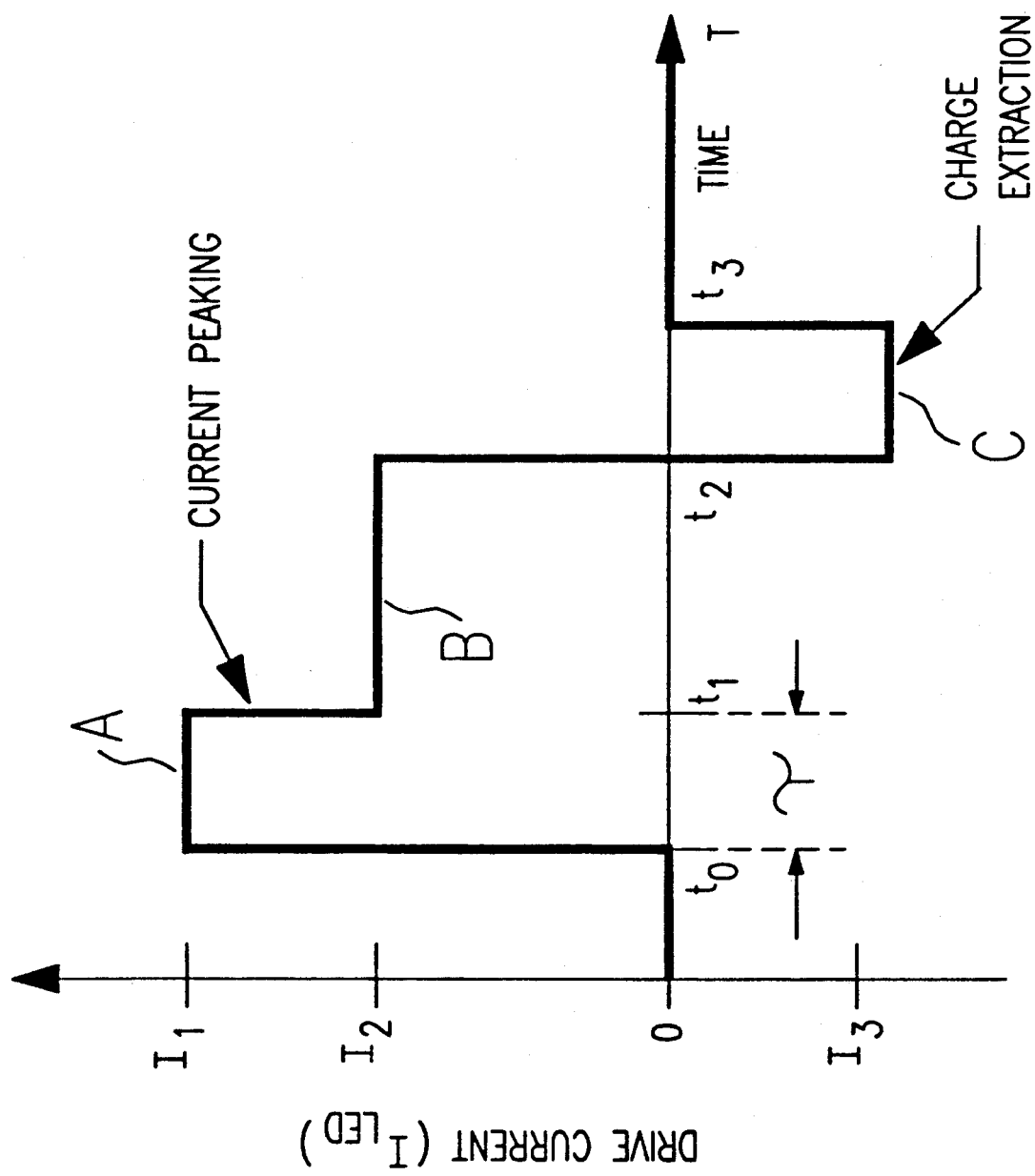
FIG. 2 contains a simplified diagram of the LED drive current generated by the circuit of FIG. 1.

The operation of circuit 10 may be understood by reference to FIG. 2, which illustrates the ideal LED drive current as a function of time. In particular, LED 18 (FIG. 1) turns ON at time $t_0$ when a forward current path is created by switching ON transistors 24 and 14, while maintaining transistors 24 and 14, while maintaining transistors 26 and 12 OFF, indicated by the initial increased current peaking level $I_1$, as shown in FIG. 2.

After a predetermined delay $\} (\} = t_1 - t_0)$, transistor 26 switches ON, bring in transistor 14 closer to saturation, thus reducing the level of drive current $I_{LED}$ to the value $I_2$, indicated by the letter B in FIG. 2. The level of $I_2$ is determined in circuit 10 of FIG. 1 by the value of resistor 20. At the completion of the bit period (time $t_2$), transistors 24 and 14 switched OFF, while transistor 12 is turned ON. Since transistor 26 remains ON, a reverse current path is created from transistor 26 through transistor 12, drawing a current $I_{LED}$ of value $I_3$ in the reverse direction through LED 18, a indicated by the letter C in FIG. 2. The level of reverse current $I_3$ is determined by the value of resistor 22. Finally, at time $t_3$ transistor 26 is turned OFF and LED drive current $I_{LED}$ is returned to the zero (or other suitable reference)level.

Referring to FIG. 2, section A of the LED drive current can be referred to as the current peaking portion, and section C as the charge extraction portion. As discussed above, the values of $I_1$ and $I_3$ associated with current peaking and charge extraction, respectfully, are controlled by adjusting the values of resistor 20 and 22, respectively. Typical values are $I_1$ and $I_2$ may fall within the ranges of 100-120 mA and 60-80 mA, respectively. Reverse current $I_3$ may typically fall within the same range as $I_2$. Additionally, varying the delay $\}$ will also modify the performance of circuit 10. Therefore, the circuit arrangement of the present invention may be tailored to adjust to a specific application (e.g., only current peaking, only charge extraction, both peaking and extraction to varying degrees), or to the performance levels of individual LED devices, since each device may exhibit slightly different characteristics. It is to be noted that the utilization of an extremely short delay $\tau$(for example, $<1$ ns) will produce no pulse shaping effect, whereas too long a delay (for example, $>3$ ns) will allow the LED junction to eventually become reverse-biased, a condition which may degrade device reliability. The length of the delay is further limited by the system bit rate. For example, in a 200 Mb/s system, each pulse is 5 ns in duration. Therefore, the delay must be less than 5 ns so that the circuit will be able to respond in time to the next data pulse. Additionally, the values of resistors 20, 22 may be limited by the available voltage range. In other words, drive current $I_1$ and $I_3$ may not exceed certain limits as determined by the voltage head room of the system. In most applications, however, resistors 20, 22 will be rather small and the drive current rather low, thus allowing for sufficient voltage headroom to provide the desired amount of current peaking and/or charge extraction.

Figure 3:
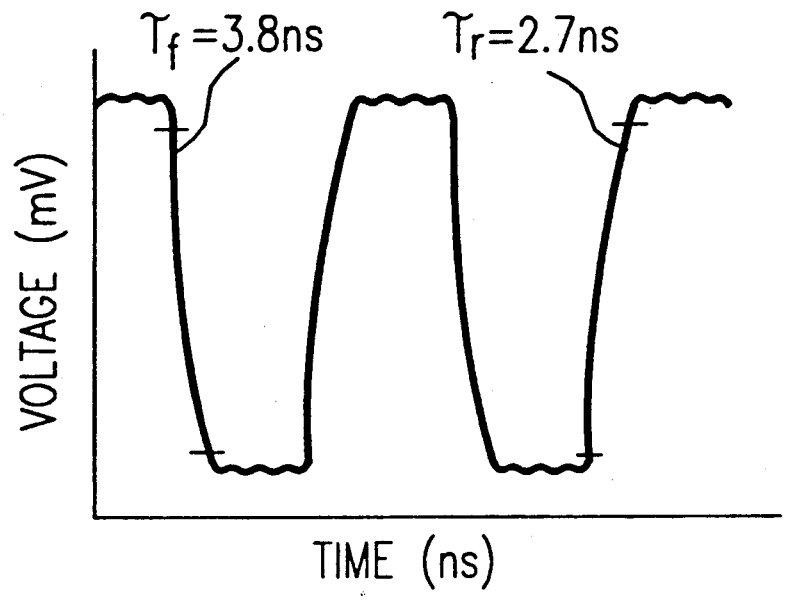
FIG. 3 illustrates an output pulse of a long wavelength LED, without any pulse shaping.
Figure 4:
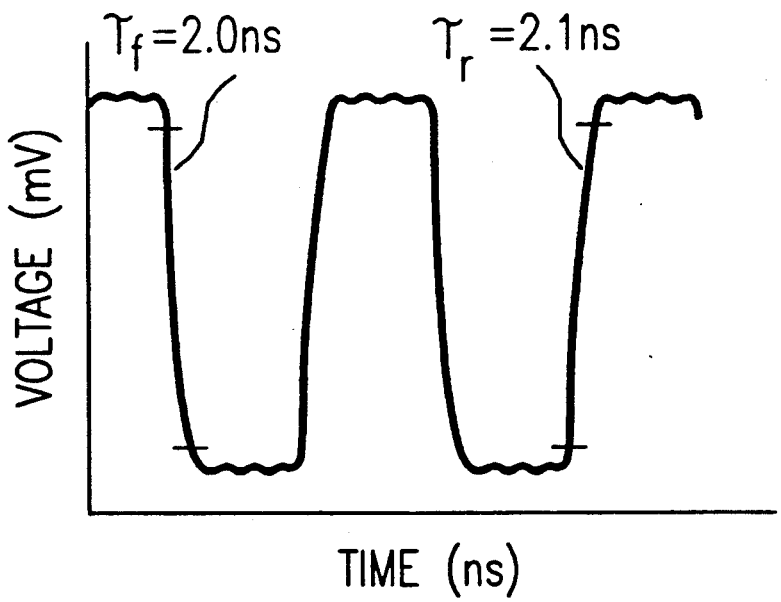
FIG. 4 illustrates, by way of comparison, an output pulse of a long wavelength LED coupled to an exemplary pulse shaping circuit of the present invention.

FIG. 3 illustrates an exemplary output pulse of a long wavelength LED. For the illustrated pulse, an InGaAsP LED was coupled to a conventional differential LED driver (such as differential current switch 19 of FIG. 1) with 80 mA of drive current. When operated at a data rate of 125 Mb/s, the LED exhibited a rise time of approximately 2.7 ns and a fall time of approximately 3.8 ns. In contrast, FIG. 4 illustrates an exemplary output pulse of a similar LED when coupled to a switched bridge pulse shaping circuit of the present invention. When operated at the same data rate, with the same drive current during the bit period, the rise time was reduced to 2.1 ns and the fall time to 2.0 ns. In this particular arrangement and delay of 2 ns was utilized between the turn ON of transistors 24, 14 and transistor 27.

I claim:
1. A circuit for providing a pulse-shaped drive current to an LED for switching said LED between an ON and an OFF state, the circuit comprising
   peaking means (24, 14) coupled to the LED for providing a forward current of a first current level ($I_1$) through said LED to initiate the ON state of said LED;
   current lowering means (26, 20) coupled to the LED and cooperating with said peaking means for lowering said forward current to a second current level ($I_2$) less than said first current level for maintaining said LED in the ON state for a predetermined time after a predetermined time period $\tau$ and;
   extracting means (22, 12) coupled to the LED and cooperating with said current lowering means for providing a reverse current ($I_3$) through said LED to initiate the OFF state of said LED.

2. A circuit as defined in claim 1 wherein the current lowering means is adjustable.

3. A circuit as defined in claim 2 wherein the adjustable current lowering means includes a variable resistance.

4. A circuit as defined in claim 1 wherein the extracting means is adjustable.

5. A circuit as defined in claim 4 wherein the adjustable driving means includes a variable resistance.

6. AN LED drive circuit comprising
   a first switching transistor (24) including emitter, base and collector regions, the emitter coupled to a first terminal of the LED, the collector coupled to a first power supply and the based coupled to receive a first activation pulse such that the first switching transistor is turned ON in response to said first activation pulse;
   a second switching transistor (26) including emitter, base and collector regions, the collector coupled to said firs power supply and the base cooled to receive a second activation pulse delayed in time ($\tau$) with respect to said firs activation pulse such that the second switching transistors is turned ON in response to said second activation pulse;
   a fist resistor (20) coupled between the emitter of said second switching transistor and the second, remaining terminal of said LED;
   a constant current source (16)d;
   a third switching transistor (14) including emitter, base and collector regions, the emitter coupled to said constant current source, the collector coupled to the second terminal of said LED and the base coupled to receive said first activation pulse such that said third switching transistor is turned ON in response to said first activation pulse;
   a fourth switching transistor (12) including emitter, base and collector regions, the emitter coupled to said constant current source and the base coupled to receive said first activation pulse such that said fourth transistor is tuned OFF in response to said first activation pulse, the combination of said constant current source, third switching transistor and fourth switching transistor forming a differential current switch; and
   a second resistor (22) coupled between the collector of the fourth switching transistor and the first terminal of the LED.

7. An LED drive circuit as defined in claim 6 wherein the first and second resistors comprise variable resistors.

* * * * *